United States Patent
Walker et al.

(10) Patent No.: US 7,558,527 B2
(45) Date of Patent: Jul. 7, 2009

(54) RADIO RECEIVER SYSTEM AND METHOD OF INJECTING AUDIO CONTENT

(75) Inventors: Glenn A. Walker, Greentown, IN (US); Andrew L. Wilhelm, Carmel, IN (US); Mathew A. Boytim, Kokomo, IN (US); Timothy D. Bolduc, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 498 days.

(21) Appl. No.: 11/510,439

(22) Filed: Aug. 25, 2006

(65) Prior Publication Data
US 2008/0051047 A1 Feb. 28, 2008

(51) Int. Cl.
H04M 1/00 (2006.01)
H04B 1/18 (2006.01)

(52) U.S. Cl. .................. 455/3.06; 455/569.1; 455/345

(58) Field of Classification Search ............... 455/3.02, 455/3.06, 41.2, 41.3, 99, 118, 120, 345, 569.1, 455/569.2
See application file for complete search history.

(56) References Cited

U.S. PATENT DOCUMENTS

| | | | |
|---|---|---|---|
| 2003/0236075 A1* | 12/2003 | Johnson et al. | 455/99 |
| 2006/0223467 A1* | 10/2006 | Mason | 455/185.1 |
| 2007/0142010 A1* | 6/2007 | Christopher | 455/161.1 |
| 2007/0173293 A1* | 7/2007 | Tran | 455/569.1 |
| 2007/0298710 A1* | 12/2007 | Sams | 455/3.06 |

* cited by examiner

*Primary Examiner*—Blane J Jackson
(74) *Attorney, Agent, or Firm*—Jimmy L. Funke

(57) ABSTRACT

A system and method of injecting audio content into a radio system is provided. The method includes the steps of receiving in a radio receiver a first RF signal from an antenna and processing the signal at a select frequency within a radio frequency band. The method also includes the step of providing audio content from an auxiliary device. The method also includes the step of modulating the audio content from the auxiliary device and replicating the modulated signal to generate a replicated RF signal at the multiple frequencies within the radio frequency band. The method further includes the step of injecting the replicated RF signal into the radio receiver.

20 Claims, 4 Drawing Sheets

FM TIME SIGNAL WITH PULSE TRAIN SWITCH

FM FREQUENCY SIGNAL WITH PULSE TRAIN SWITCH

THEORETICAL 20 MHz FREQUENCY INDEX
FM BANK WITH PULSE TRAIN SWITCH

RADIO RECEIVER SYSTEM AND METHOD OF INJECTING AUDIO CONTENT

TECHNICAL FIELD

The present invention generally relates to audio radios, and more particularly relates to the injection of audio content from an auxiliary device to a radio receiver.

BACKGROUND OF THE INVENTION

Automotive vehicle AM/FM radios are generally configured to receive broadcast radio frequency (RF) signals that are processed at a user selected radio frequency to acquire and play audio content. For example, a listener may select frequency modulated (FM) RF signals in the radio frequency band ranging from about 88.1 to 107.9 MHz, typically selectable at 200 kHz increments. Auxiliary sources of audio content may be available and may be configured to communicate with the vehicle radio to allow for multiple sources of audio content to be played by the vehicle radio.

Conventional methods for injecting an RF signal containing audio content into an existing car radio system 110 generally employ an FM modulator 124 associated with an auxiliary device 122 as shown in FIG. 1. According to one method, the FM modulator 124 outputs an FM modulated RF signal 130 at a predetermined single FM frequency $W_c$ to a switch 120. The switch 120 interrupts the connection from the antenna 118 and its received RF FM signal 132 to the car radio receiver 112 and injects the RF FM signal 130 at predetermined FM frequency $W_c$. However, this approach generally requires the user to select the appropriate FM station frequency $W_c$ prior to use.

According to another conventional approach, a method detects LO signal leakage from the radio, generally between the radio receiver and the antenna, and determines from the signal leakage which FM frequency station the user is listening to. This method then modulates the audio content at the determined frequency $W_c$ to inject the audio content in an RF signal 130 into the radio by switching the connection from the antenna received RF signal 132 to the RF signal 130 applied to the radio receiver 112 via the switch 120. However, the method of detecting LO signal leakage generally requires sufficient LO signal leakage from the radio to be detected, which typically is not available on many modern day radios. Additionally, this conventional method typically requires the installed radio to have standard RF tuner frequencies.

Accordingly, it is therefore desirable to provide for a system and method of injecting audio content into a radio that does not require user selection of a specific radio frequency or detection of leakage signal from the radio. In particular, it is desirable to provide for a vehicle radio system that allows for an auxiliary audio source to inject audio content into the radio in a manner that is easy to use and reliable.

SUMMARY OF THE INVENTION

In accordance with the teachings of the present invention, a system and method of injecting audio content into a radio is provided. According to one aspect of the present invention, a method of injecting audio signal content into a radio receiver is provided. The method includes the steps of receiving in a radio receiver a first RF signal from a first source, wherein the radio receiver processes the first RF signal at a select frequency within a radio frequency band. The method also includes the step of providing audio content from a second auxiliary source. The method includes the steps of modulating the audio content from the second auxiliary device to generate a modulated signal and replicating the modulated signal to generate a replicated second RF signal at multiple frequencies within the radio frequency band. The method further includes the step of injecting the replicated RF signal into the radio receiver.

According to another aspect of the present invention, an audio system is provided that receives injected audio signal content and injects the audio signal content into a radio. The audio system includes a radio receiver for receiving first RF signals at frequencies in a radio frequency band and processing the signals at a select frequency. The audio system also includes a switch coupled to the radio receiver for selecting an input signal to the radio receiver. The system has a first RF signal source coupled to the switch for providing a first RF signal at a select frequency in the radio frequency band and a second auxiliary RF signal source for injecting audio content into the radio receiver. The method further includes a modulator for modulating the audio content to generate a modulated signal and a signal replicator for generating a replicated second RF signal containing the modulated audio content at multiple frequencies within the radio frequency band for input to the second input of the switch, wherein the switch inputs the replicated second RF signal to the radio receiver.

Accordingly, the system and method advantageously injects audio content into a radio receiver without requiring user selection of a specific radio frequency or detection of a leakage signal from the radio. The system and method are easy to use and reliable to inject audio content from an auxiliary source into the radio.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
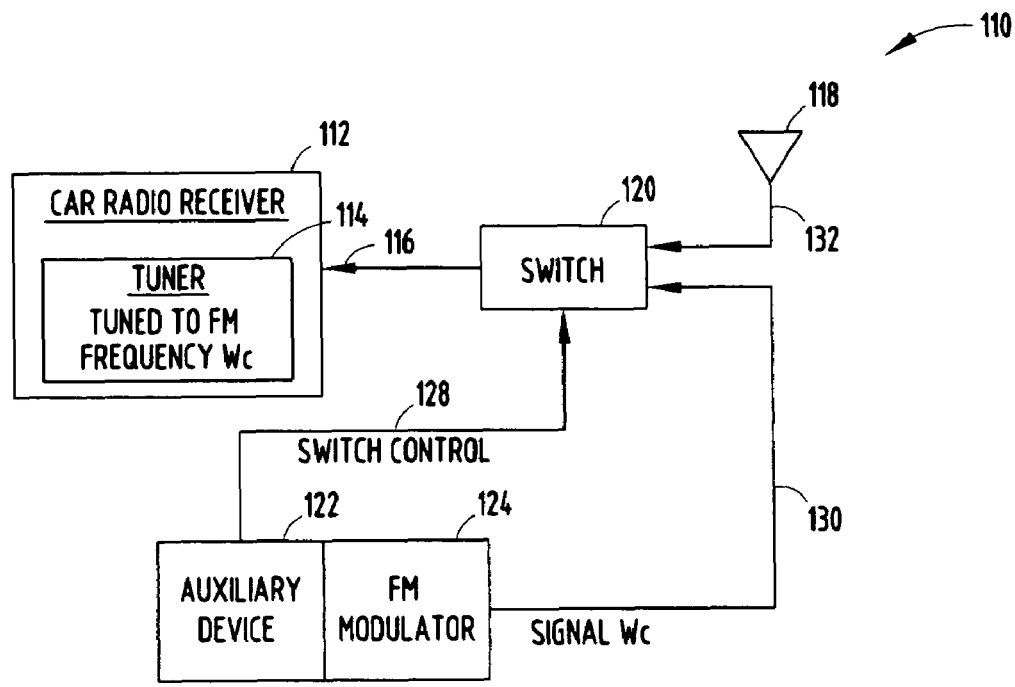
FIG. 1 is a block diagram illustrating a conventional audio radio system employing an auxiliary device and FM modulator.
Figure 2:
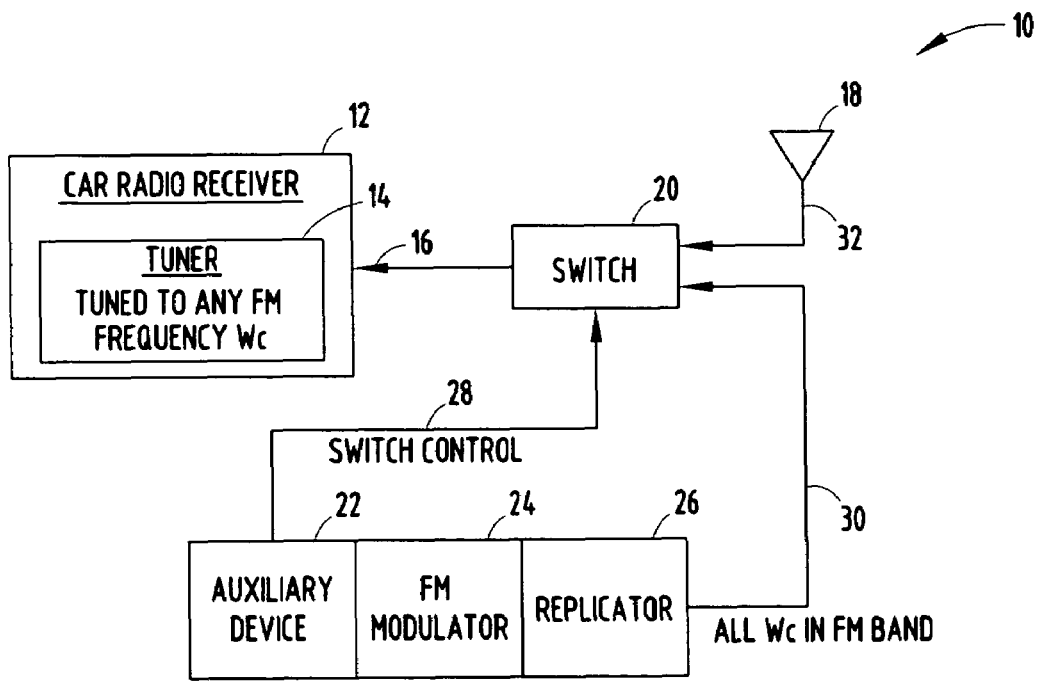
FIG. 2 is a block diagram illustrating an audio radio system employing an auxiliary device and FM modulator and replicator, according to one embodiment of the present invention.

Referring now to FIG. 2, an audio radio system 10 is illustrated that receives audio content in a first RF signal from a first RF source, shown as an antenna 18. The radio system 10 also receives injected audio signal content from a second RF source, shown as an auxiliary device 22, according to one embodiment of the present invention. The audio radio system 10 is shown employing a car radio receiver 12 having a tuner 14, such as an FM tuner. The FM tuner 14 may be tuned to any RF FM frequency $W_c$ such as the standard FM frequencies broadcast between about 88 and 108 MHz, centered in slots at 200 kHz increments, such as 88.1 MHz, 88.3 MHz, 88.5 MHz, . . . 107.5 MHz, 107.7 MHz and 107.9 MHz. While the car radio receiver 12 is shown as an FM radio receiver, it should be appreciated that the audio radio system 10 may employ other radio receivers, such as an AM receiver configured with a tuner to receive AM frequency signals, without departing from the teachings of the present invention.

The car radio receiver 12 is shown having an input 16 for receiving a selected signal from switch 20. Switch 20 has a first input for receiving a first RF signal 32 from antenna 18 and a second input for receiving a second RF signal 30 that is generally processed as the output of the auxiliary device 22. The switch 20 is controlled in response to a switch control signal 28 received from the auxiliary device 22 to select one of RF signals 30 and 32 as the input 16 to the radio receiver 12. When the auxiliary device 22 is to inject audio content into radio receiver 12, switch control signal 28 causes switch 20 to switch the input 16 to receive signal 30 instead of signal 32.

The auxiliary device 22 may include any of a number of audio content sources such as a cell phone, a CD player, a satellite radio, or other devices that may be employed to inject audio content such as audio sound and/or data to the car radio receiver 12. The auxiliary device 22 may be wired into switch 20 using conventional coaxial audio cables or other wire connections, or may employ wireless signal communication. The auxiliary device 22 may be mounted within a vehicle or may be a portable device brought on board the vehicle. The auxiliary device 22 operates as an additional source of audio content that is input to the radio receiver 12 for broadcast or display to one or more users within the vehicle.

The audio radio system 10 includes an FM modulator 24 which may be separate from or integrated within the auxiliary device 22. The FM modulator 24 receives the audio content output from the auxiliary device 22 and modulates the audio content in an FM signal, according to one embodiment. The modulator 24 outputs the modulated output signal to a replicator 26. The replicator 26 may be a stand alone device or may be integrated with the FM modulator 24. The replicator 26 and FM modulator 24 may be integrated together such as on an application specific integrated circuit (ASIC). The replicator 26 outputs the modulated RF signal containing the audio content to be injected at all selectable FM radio frequency selections as RF signal 30.

Figure 3:
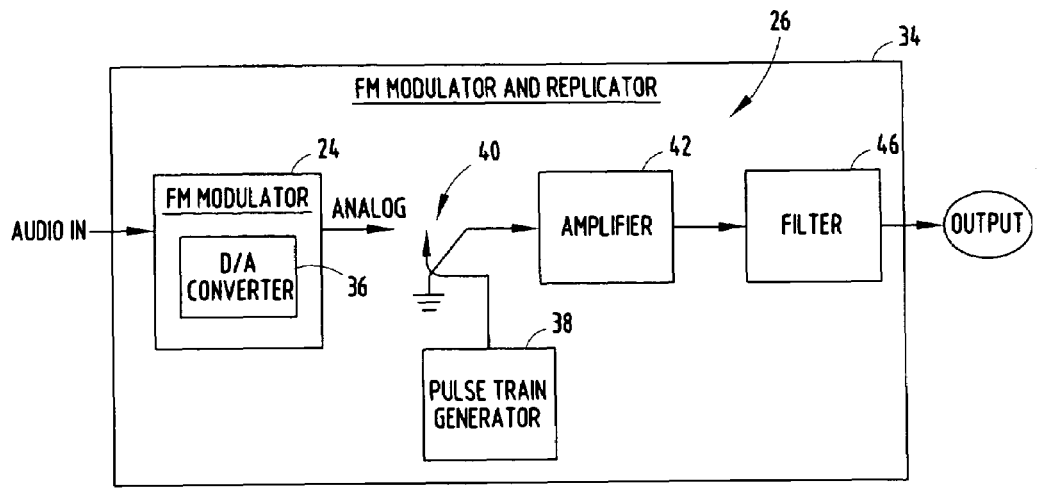
FIG. 3 is a block diagram illustrating the FM modulator and replicator in FIG. 2, according to a first embodiment of the present invention.

The FM modulator 24 and replicator 26 are further illustrated in FIG. 3, according to a first embodiment of the present invention. The FM modulator 24 is shown receiving a digital input signal containing the audio content from the auxiliary device 22 and providing a modulated output analog signal. The audio input signal containing audio content may be transmitted as streamed data. In this embodiment, the FM modulator 24 has a digital-to-analog (D/A) converter 36 for converting the digital input signal to an analog signal. However, it should be appreciated that the FM modulator 24 may alternatively receive an analog input signal and provide a modulated analog output signal, without requiring use of the digital-to-analog converter 36. Additionally, it should be appreciated that the FM modulator 24 may receive either an analog or digital audio input signal and provide a digital output signal according to other embodiments.

The analog output signal from FM modulator 24 is input to a pulse train switch 40 which also receives a pulse train signal from a pulse train generator 38. The pulse train generator 38 generates a periodic signal pulsed at a frequency of approximately 200 kHz, according to one example. The pulsed signal closes the switch 40 to ground out the analog input signal at a periodic rate of 200 kHz. The pulse train switch 40 essentially inserts grounded signals or zeros into the analog input signal. This in effect creates a broad spectrum due to harmonics. The pulse train switched output of switch 40 is amplified by an amplifier 42. The amplified signal is then filtered by bandpass filter 46 having a pass band in the FM radio frequency band of about 88 to 108 MHz.

The filtered and amplified modulated FM signal is output as the RF signal 30. The output RF signal 30 provides the audio content at all FM radio frequencies $W_c$ as an input to switch 20 which, when switched by auxiliary device 22, is input to the car radio receiver 12. In effect, the output RF signal 30 provides the audio content centered at all possible FM frequency slots (selections) such that the FM radio receiver 12 receives and processes the output RF signal 30 and its audio content no matter what frequency selection the tuner 14 is set at.

Figure 4:
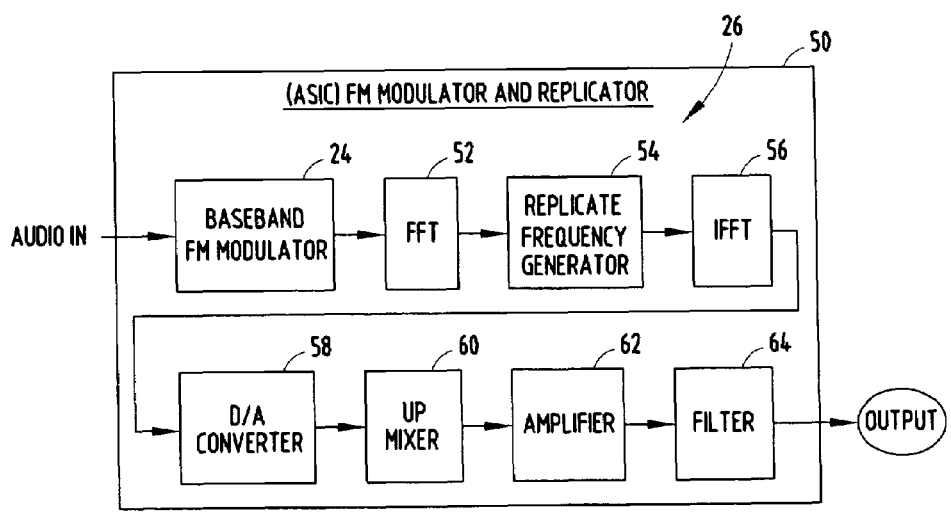
FIG. 4 is a block diagram illustrating the FM modulator and replicator in FIG. 2, according to a second embodiment of the present invention.

The FM modulator 24 and replicator 26 may be implemented on an ASIC 50 as shown in FIG. 4 according to a second embodiment of the present invention. According to this embodiment, the audio input signal is input to a baseband FM modulator 24. The FM modulator 24 generates a baseband (low frequency) RF FM signal. The output of the FM modulator 24 is transformed from a time domain signal to a frequency domain signal by performing a fast Fourier transform (FFT) 52. In the frequency domain, the output of the fast Fourier transform 52 is replicated by a replicate frequency generator 54 which essentially copies the modulated RF signal at each incremental frequency slot of 200 kHz throughout the FM radio frequency bandwidth. The replicated RF signal in the frequency domain is then converted back to the time domain with an inverse fast Fourier transform (IFFT) 56. The replicated RF signal in the time domain is then converted to an analog RF signal with a digital-to-analog (D/A) converter 58. The analog RF output signal of the D/A converter 58 is then up mixed by up mixer 60 and amplified by amplifier 62. The amplified RF signal is filtered by bandpass filter 64 to pass the FM frequency band and outputs the output RF signal 30 centered at all FM frequency selections (e.g., 88.1 MHz, 88.3 MHz, 88.5 MHz, 88.7 MHz, etc.) as discussed above.

The magnitude of each FM signal slot can be individually controlled, if desired. In one embodiment, the data can be upsampled by zero insertion, which is equivalent to mixing with an impulse train. The impulse train may be considered the simplest signal with the desired spectral properties. This can be implemented in the D/A converter 58 using short return to zero pulses. More general mixing signals can be used, but the more enhanced speed may require a digital signal processor (DSP) or other ASIC.

Figure 5:
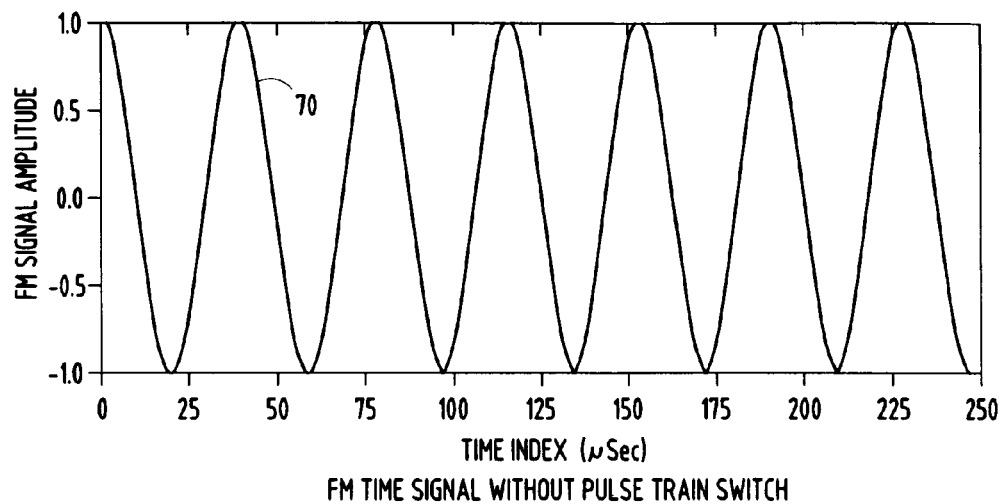
FIG. 5 is a graph illustrating a baseband signal in the time domain without applying the pulse train switch.
Figure 6:
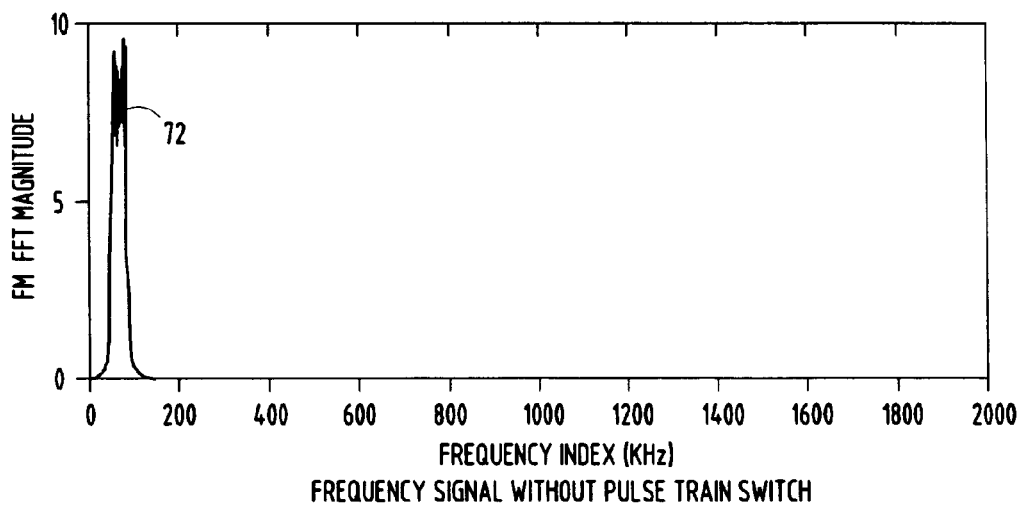
FIG. 6 is a graph illustrating an FM time signal in the frequency domain without the pulse train switch applied.

Referring to FIG. 5, one example of the FM time signal 70 is illustrated without the pulse train switching which essentially is the output of the FM modulator 24. The modulated signal 70 has a sinusoidal waveform and an FM signal amplitude from −1.0 to +1.0 v. In FIG. 6, the output of the FM modulator 24 is shown transformed to the frequency domain having signal 72 without the pulse train switching. In effect, this would be equivalent to the output of the fast Fourier transform 52 in FIG. 4.

Figure 7:
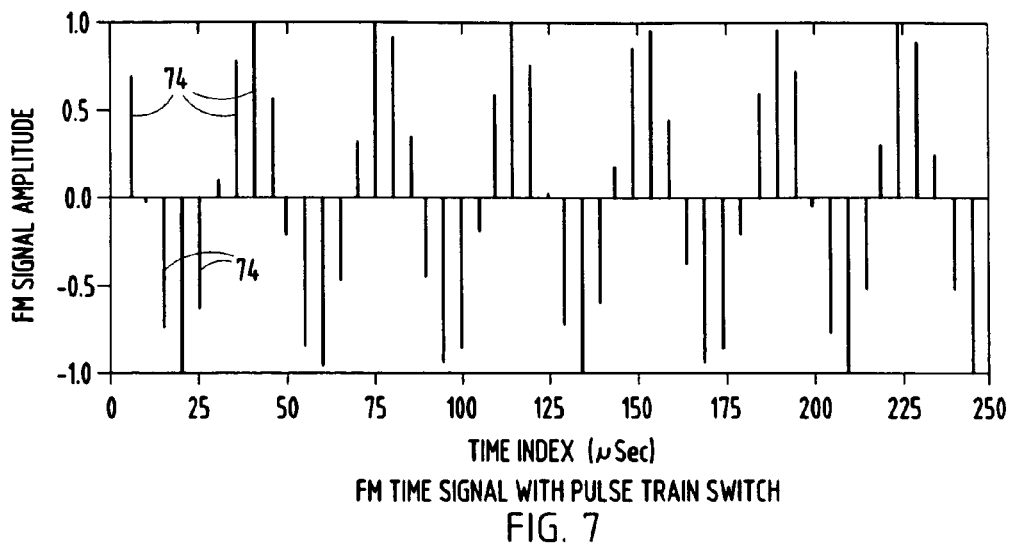
FIG. 7 is a graph illustrating the FM time signal with the pulse train switch applied.
Figure 8:
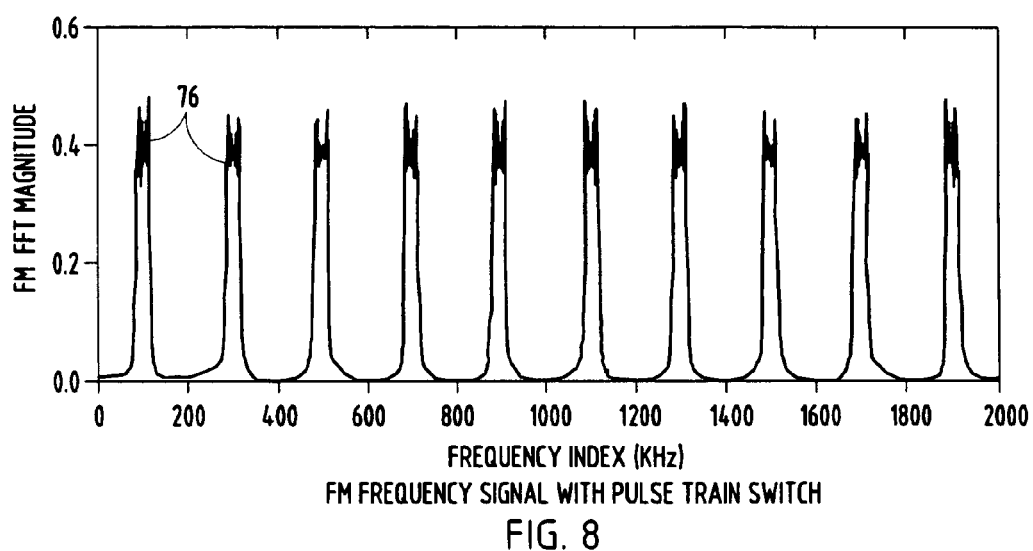
FIG. 8 is a graph illustrating the FM signal in the frequency domain with the pulse train switch applied.

In FIG. 7, the FM time signal 74 is illustrated with the pulse train switching applied. This is equivalent to the time domain signal that is input to the amplifier 42 in FIG. 3 after the pulse train switching. Referring to FIG. 8, the replicated FM signal in the frequency domain is illustrated having signal spikes 74 at 200 kHz increments. The spikes 76 are essentially mirrored about the low points between signal peaks which essentially is the output of switch 40. According to the second embodiment, the waveform shown in FIG. 8 would be the identical peak signal 76 at 200 kHz increments in that the waveform is copied at every 200 kHz increment by the replicate frequency generator 54.

Figure 9:
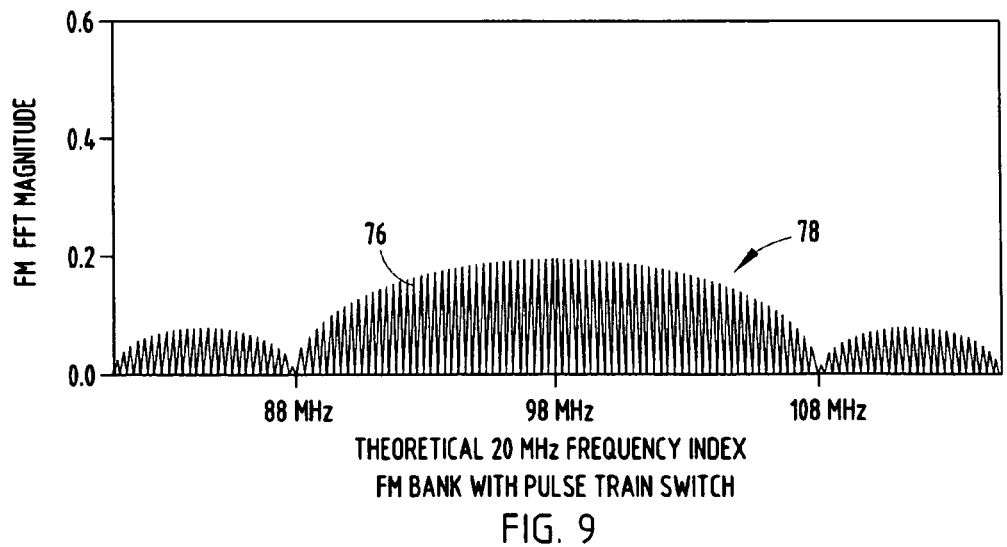
FIG. 9 is a graph illustrating one example of the replicated audio signal throughout the entire FM radio bandwidth.

Referring to FIG. 9, the theoretical 20 MHz frequency index is shown for the entire FM frequency band with the pulse train switching providing a plurality of peak signals 76 within the 20 MHz FM radio frequency bandwidth 78 ranging from about 88 MHz to 108 MHz. As seen, the resulting waveform provides the broadcast of audio content at each selectable FM frequency selection within the entire bandwidth 78 ranging from about 88 MHz to 108 MHz such that the radio receiver acquires the injected audio content from the auxiliary device and is able to process and play the audio content without requiring user intervention to select a frequency.

Accordingly, the audio radio system 10 and method advantageously provide for the injection of audio content from an auxiliary device 22 into a radio receiver 12 in a manner that does not require user intervention to select the radio frequency and is easy to use.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A method of injecting audio signal content into a radio receiver, said method comprising the steps of:
   receiving in a radio receiver a first RF signal from a first source, wherein the radio receiver processes the first RF signal at a select frequency within a radio frequency band;
   providing audio content from a second auxiliary source;
   modulating the audio content from the second auxiliary device to generate a modulated signal;
   replicating the modulated signal to generate a replicated second RF signal at multiple frequencies within the radio frequency band; and
   injecting the replicated RF signal into the radio receiver.

2. The method as defined in claim 1 further comprising a step of switching off the received first RF signal and switching on the replicated second RF signal.

3. The method as defined in claim 1 further comprising the step of generating a baseband RF signal comprising using a digital-to-analog converter, wherein aliasing of discrete signals creates the replicated second RF signal at multiple frequencies in the radio frequency band.

4. The method as defined in claim 1, wherein the RF signal comprises an FM signal and the step of modulating comprises frequency modulating.

5. The method as defined in claim 4 further comprising the step of converting the replicated second RF signal to broadcast FM center frequencies.

6. The method as defined in claim 1 further comprising the step of amplifying the replicated second RF signal.

7. The method as defined in claim 1 further comprising the step of filtering the replicated second RF signal.

8. The method as defined in claim 1 further comprising the step of generating a baseband RF signal and up-mixing the baseband RF signal.

9. The method as defined in claim 1 further comprising the step of transforming the modulated signal to the frequency domain prior to replicating the second RF signal.

10. The method as defined in claim 9 further comprising the step of transforming the replicated second RF signal to the time domain.

11. An audio radio system that receives injected audio signal content, said audio radio system comprising:
    a radio receiver for receiving first RF signals at frequencies in a radio frequency band and processing the received first RF signals at a select frequency;
    a switch coupled to the radio receiver for selecting an input signal to the radio receiver;
    a first RF signal source coupled to the switch for providing a first RF signal at a select frequency in the radio frequency band;
    a second auxiliary RF signal source for injecting audio content into the radio receiver;
    a modulator for modulating the audio content to generate a modulated signal; and
    a signal replicator for replicating the modulated signal to generating a replicated second RF signal containing the modulated audio content at multiple frequencies within the radio frequency band for input to the second input of the switch, wherein the switch inputs the replicated second RF signal to the radio receiver.

12. The radio system as defined in claim 11, wherein the modulator comprises a digital-to-analog converter.

13. The radio system as defined in claim 11, wherein the modulator comprises an FM modulator.

14. The radio system as defined in claim 11, wherein the signal replicator comprises a pulse train generator.

15. The radio system as defined in claim 11, wherein the signal replicator comprises a replicate frequency generator.

16. The radio system as defined in claim 15, wherein the replicator further comprises a fast Fourier transform for transforming the modulated signal to a frequency domain, and wherein the replicate frequency generator replicates the modulated signal in the frequency domain.

17. The radio system as defined in claim 16, wherein the replicator further comprises an inverse first Fourier transform for transforming the replicated signal to a time domain.

18. The radio system as defined in claim 11 further comprising one or more up mixers for up mixing the replicated modulated signal.

19. The system as defined in claim 11 further comprising an amplifier for amplifying the replicated signal.

20. The method as defined in claim 11 further comprising a filter for filtering the replicated signal.

* * * * *